May 24, 1927.
H. B. THURSTON
LOW WATER ALARM
Filed June 5, 1923
1,629,936
2 Sheets-Sheet 1
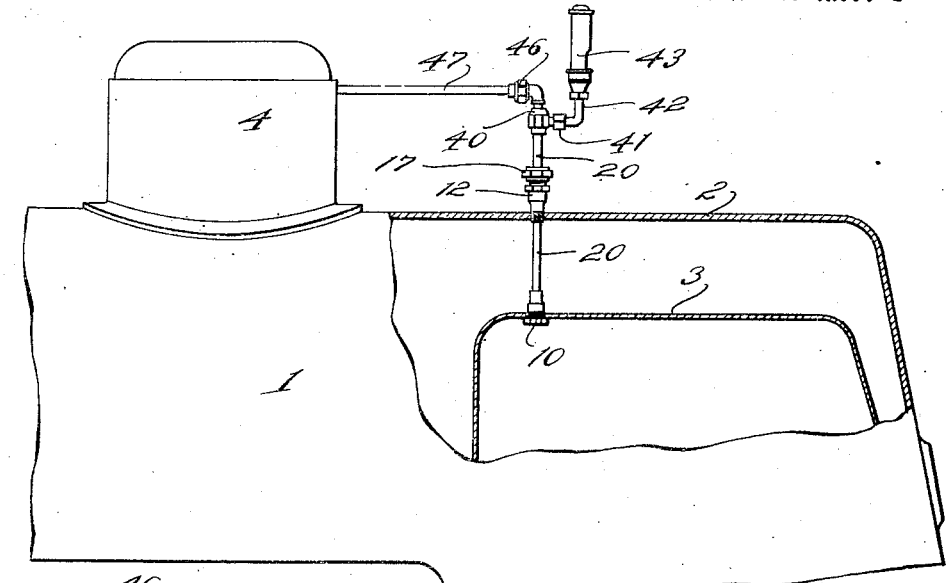
Fig.-1
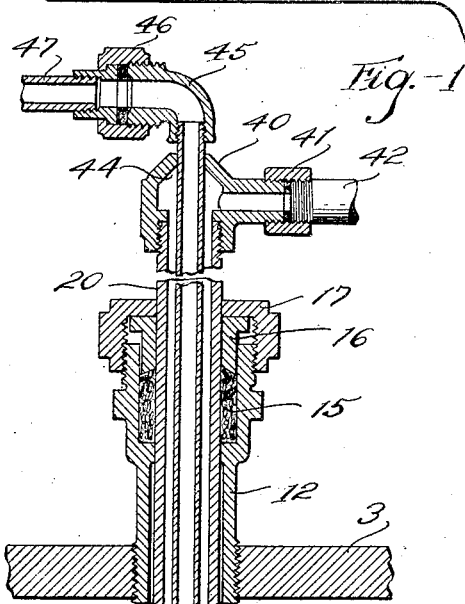
Fig.-2
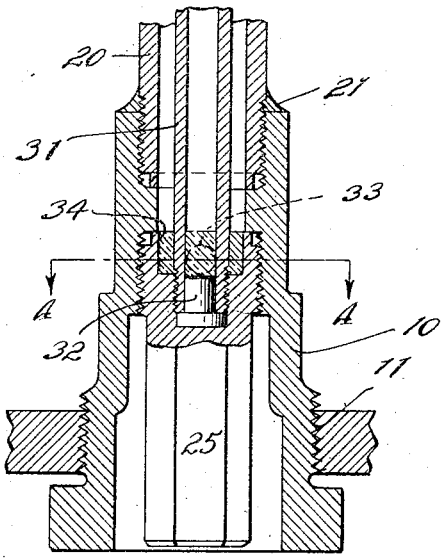
Fig.-3
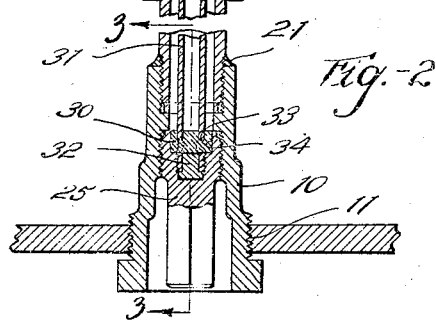
INVENTOR
Herman B. Thurston
By Bates & Macklin,
ATTYS.

May 24, 1927.
H. B. THURSTON
1,629,936
LOW WATER ALARM
Filed June 5, 1923     2 Sheets-Sheet 2
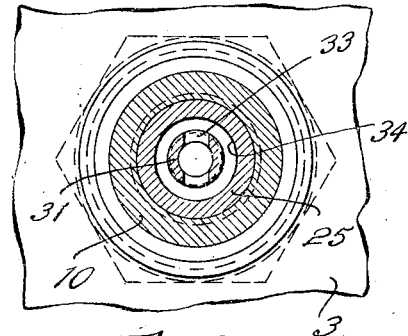
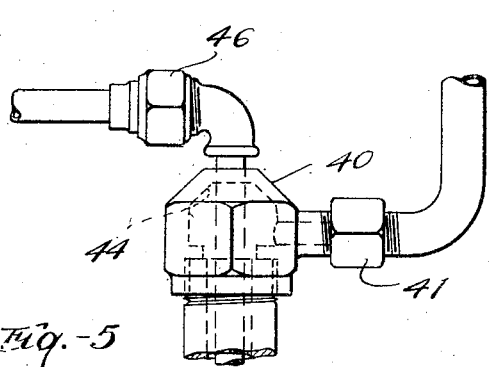
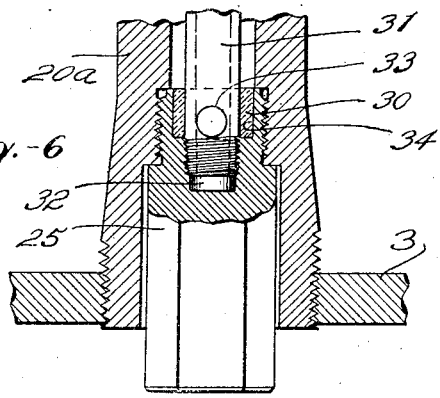
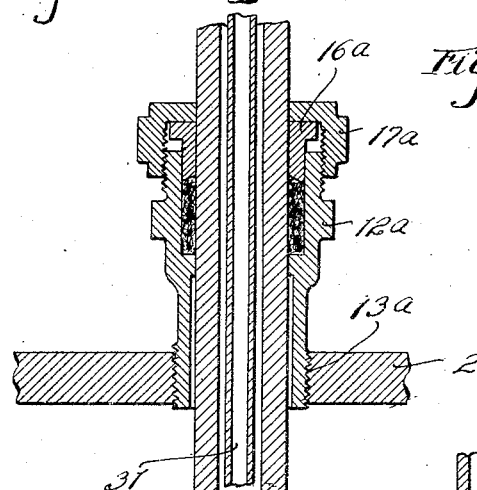
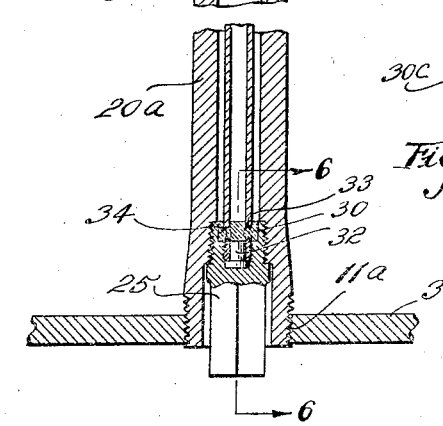
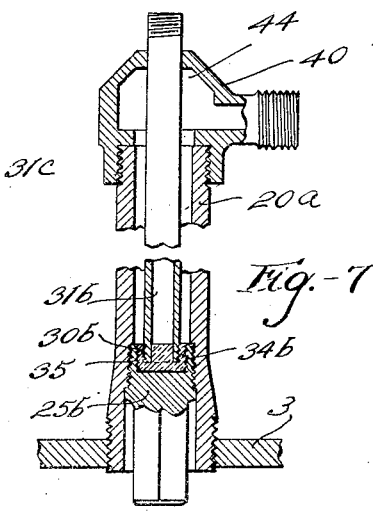
INVENTOR.
Herman B. Thurston
BY Bates & Macklin
ATTYS.

Patented May 24, 1927.

1,629,936

UNITED STATES PATENT OFFICE.

HERMAN B. THURSTON, OF CLEVELAND HEIGHTS, OHIO.

LOW-WATER ALARM.

Application filed June 5, 1923. Serial No. 643,512.

My invention relates to low water alarms for steam boilers wherein readily fusible material normally closes a conduit leading from within the boiler to a signal. The position of the fusible material in this and similar devices is such that should the water reach a dangerously low level, such material fuses under the resulting higher temperature, allowing the passage of steam to operate the signal.

The primary object of my invention is the provision of a steam operated low water alarm in which the fusible metal absolutely seals the end of the conduit which carries the live steam, while at the same time means are provided for the ready conduction of heat from the fire box to such metal.

Another object is the provision of a simple and cheaply manufactured alarm system in which the seal of fusible material may be molded in place on the steam conduit and tested at the time of manufacture and thereafter readily installed in a steam boiler with all the functioning parts fully protected against scale or disintegrating agents. My molded seal avoids the necessity of gaskets or other means for maintaining a steam tight seating of the plug positioning the fusible material, the pressure being confined by molding the pipe shut. I arrange the live steam pipe, the seal and the carrying plug in the interior of a tubular casing leading from the crown sheet to the exterior of the boiler, whereby the sealed steam pipe may be removed as a unit for inspection or for external replacement of the seal whenever desired without disturbing the rest of the installation.

A further object is the provision of a means whereby the seal after fusing may be entrapped within the instrument itself, allowing the use of any steam operated alarm in connection with my invention, such, for instance, as a whistle ordinarily used on boilers for signaling purposes.

Further objects and features of my invention will become apparent from the description with reference to the accompanying drawings, and the essential novel characteristics will be summarized in the claims.

In the drawings, Fig. 1 is a side elevation of a boiler partly broken away to show the application of my alarm system thereto; Fig. 2 is a vertical central section of the alarm exclusive of the signaling device; Fig. 3 is a vertical section taken at right angles to Fig. 2 of the fusible element, the plug and adjacent parts; Fig. 4 is a horizontal section taken along the lines 4—4 of Fig. 3, with the fusible element removed; Fig. 5 is a vertical central section of an alternate construction of my low water alarm; Fig. 6 is a fragmentary section at right angles to Fig. 5; Fig. 7 is a sectional view showing an alternate method of closing the passage for the steam by the fusible material and Fig. 8 shows still another method of applying the fusible material.

In Fig. 1, 1 indicates a steam boiler; 2 the boiler shell; 3 the crown sheet, and 4 the steam dome. In the specific form of my invention shown in Figs. 1-4, I have mounted a threaded sleeve 10 in the crown sheet of the boiler, suitable threads 11 being provided to receive this sleeve within the fire box. Another suitable sleeve 12 is secured to the roof portion of the boiler shell in the same manner. This latter sleeve is adapted to form a seat for packing 15 and a packing nut and gland 16 and 17 surrounding an outer tube 20. This tube is threaded to enter the sleeve 10 adjacent the crown sheet and may be further secured by welding as at 21.

I have shown at 25 a plug, removably secured within the sleeve 10 and adapted to receive the fusible material 30, and an inner steam pipe 31. This steam pipe may be closed at its lower end by a metal plug 32. The lower end of the pipe 31 containing the plug 32 is threaded into the top of the plug 25 as shown and suitable apertures 33 may be provided above the plug 32. A recess 34 in the plug 25 surrounds the lower end of the pipe 31 and may be filled with fusible material, preferably tin well adapted to be cast thereinto, as shown in Figs. 2 and 3. This recess is deep enough so that the tin will extend above openings 33, closing the end of the pipe and forming a ring of such fusible material about the pipe, integrally joined to the closing portion of such material.

The tube 31 extends through a suitable fitting 40 secured to the top of the pipe 20 and by means of an elbow 45 union 46 and pipe 47 is connected to the steam dome 4. The fitting 40 is connected by a nipple 41 to a signal pipe 42 which may lead to a suitable whistle or other signal 43. Thus, I have provided a path for steam through the pipes 47 and 31 that normally is effectively closed by the fusible material 30.

The temperature of the boiler adjacent the crown sheet is ordinarily such that the fusible material 30 remains solid, but should the water in the boiler fall to a dangerously low point, (below the general region of the fusible material but above the crown sheet), the heat conducted by the plug 25 will melt the material 30. The air space around the plug allows it to remain hot even though water is around the sleeve. Steam within the tube 31 will then escape through the holes 33 out of the lower portion of the pipe and upward through the tube 20, whence it will pass through the conduit 42 to a signal. Any portion of the fusible material passing up through the pipe 20 will be entrapped in the dome 44 of the fitting 40. Since there is no direct connection between the signal and the water space adjacent the crown sheet no water is carried out through the signal with the steam. This permits placing the signal in the cab of the locomotive, if desired, without danger of scalding the enginemen.

It is sometimes desirable to apply the entire alarm system from without the boiler, in which case my invention will take the form shown in Figs. 5 and 6. Here, I have shown the steam pipe connection 31 threaded into the plug 25 in the same manner as before. In this construction, the sleeve 10, however, is eliminated; the pipe 20$^a$ is directly threaded into the crown sheet at 11$^a$, and the retaining plug 25 is threaded directly into the pipe 20$^a$. This outer pipe is made considerably heavier in this construction to allow greater torsional strength necessary to securely fasten it to the crown sheet as well as to provide sufficient material so that the lower end of the tube may be expanded to accommodate the plug 25. A packing sleeve gland and nut, indicated at 12$^a$, 16$^a$ and 17$^a$ embrace the tube 20$^a$ as before. The fitting 40 is substantially the same.

In installing the form of my invention just described in the boiler, I may first insert the plug 25 carrying the fusible material and the inner pipe 31 into the tube 20$^a$ and screw the plug tightly into place, and then insert the outer tube 20$^a$ within the boiler shell and screw it into place in the crown sheet, suitable tapered threads 11$^a$ being provided for this purpose. The packing sleeve may then be slipped over the top of the tube 20$^a$ and screwed into the boiler shell by the threads 13$^a$ and the packing nut 17$^a$ screwed down upon the sleeve. The fitting 40 is then slipped over the end of the tube 31 and the steam and signal connection is made as before.

It is sometimes found convenient to secure the lower end of the steam tube by means of the fusible material itself, and the method of doing this is shown in Fig. 7. Here I have shown the inner pipe 31$^b$ as stopping short of the bottom of the recess 34$^b$ in the plug 25$^b$, the pipe being retained in place by the solidified material 30$^b$. Threads or serrations 35 in the recess may be used to retain the fusible material rigidly in place. When the material has melted, it will be blown out of the recess by the steam pressure in the inner pipe into the dome portion of the fitting 40, leaving the lower end of the pipe 31$^b$ free. A somewhat simpler form is illustrated in Fig. 8, where the fusible material 30$^c$ surrounding the threaded end of the live steam pipe 31$^c$ is designed to occupy a plain cylindrical recess in the plug 25.

It will be seen that in all of the forms shown the pipe carrying the live steam is effectively sealed at its lower end by the solidified fusible material. This fusible material is melted and poured into place while the steam pipe and the removable plug are held in proper alignment. This is done at the factory, and after the pipe, plug and fusible material are thus joined, the same may be submitted to any desired test before it is installed. In practice, I tin the end of the steam pipe and the interior of the recess in the plug with the usual flux and molten tin; then I align the plug and pipe in a suitable jig; pre-heat them, and pour the molten tin into the recess, which is at once united with the tin previously applied. I thus make a single joint between the pipe and plug.

The units comprising the pipe, plug and seal may be supplied in assembled condition ready for installation in tubular conduits previously mounted in boilers. To replace the seal after it has been melted in use, or after such lapse of time as makes replacement desirable, it is simply necessary to disconnect the union which connects the elbow on the live steam pipe with the steam dome, take off that elbow, and then from within the fire box screw out the plug and remove it and the steam pipe into the firebox.

It will be noticed that the region of the threaded engagement of the plug with the sleeve is a material distance above the crown sheet. Air space about the plug 25, as shown in the drawings, as heretofore mentioned, enables the plug to conduct the heat from the firebox directly to the fusible material, so that the fusible material may be melted even though the lower portion of the sleeve is covered with water of a considerable depth above the crown sheet. When, however, the water is higher than the fusible material, it conducts away the heat from the plug in the region where the plug engages the sleeve, and thus prevents melting of the fusible material.

I claim:—

1. The combination with a steam boiler of two conduits, one surrounding the other, readily fusible material forming an annulus about the inner end of the smaller conduit and having a portion extending transversely of the annulus for normally closing communication between the smaller and the larger conduit, one of said conduits extending to the exterior of the boiler and being provided with a signal, and the other conduit being in communication with the steam space of the boiler.

2. The combination with a steam boiler of two conduits, one surrounding the other, a removable plug mounted in the larger conduit and having a recess receiving the end of the smaller conduit, and readily fusible material cast within said recess and filling the same to a level above the inner end of said smaller conduit, one of said conduits extending to the exterior of the boiler and being provided with a signal, and the other conduit being in communication with the steam space of the boiler.

3. In a low water alarm, the combination of a live steam tube in communication with the steam space of the boiler, a tubular member surrounding the live steam tube, spaced apart therefrom throughout the entire length thereof, and connected with the crown sheet, a removable plug screwing into the tubular member opposite the end of the live steam tube, a fusible seal occupying a recess in the inner end of the plug and sealing the live steam tube, said tube having an opening within the recess communicating with the tubular member whereby when the seal is fused the tubular member serves to carry the steam from the tube, and a signal device communicating with the tubular member.

4. In a low water alarm, the combination of a tubular member secured at its inner end to the crown sheet and extending through the outer shell of the boiler, a steam pipe within said member, a plug occupying the lower portion of said tubular member and having a cavity into which the lower end of said steam pipe extends, said pipe having an opening capable of affording communication between the pipe and tubular member, and fusible material occupying said cavity and surrounding said pipe, normally filling said opening, thereby closing such communication.

5. In a low water alarm, the combination of a tubular member secured at its inner end to the crown sheet and extending through the outer shell of the boiler, a steam pipe within said member communicating at its upper end with the steam space, a plug screwing upwardly into said tubular member a considerable distance above the crown sheet and having in its upper end a cavity into which the lower end of said steam pipe extends, said pipe having an opening adjacent the cavity for affording communication between the pipe and tubular member, and fusible material occupying said cavity, surrounding the steam pipe and closing the opening in the pipe, there being an air space between the lower portion of the plug and the tubular member whereby the plug may be fused when the water falls below the region of the fusible material.

6. In a low water alarm, the combination of a live steam tube communicating at its outer end with the steam space and having its inner end located in the region of the water space of the boiler, a discharge conduit surrounding a portion of the live steam tube and connected at its inner end to the crown sheet and having its outer end on the exterior of the boiler, a plug screwing from the firebox into said discharge conduit opposite the end of the live steam tube, said plug having a cavity in its upper end into which the live steam tube extends, and said tube having an opening located within the cavity for affording communication between the tube and discharge conduit, and readily fusible material cast in said cavity, surrounding the live steam tube and normally closing the opening in said steam tube whereby the steam tube is effectively sealed.

7. In a low water alarm, the combination of a tubular member secured at its inner end to the crown sheet and extending through the outer shell of the boiler, a pipe within said member, a plug occupying the lower portion of said member, said pipe having its inner end secured to said plug and having an opening for affording communication between the pipe and tubular member, and readily fusible material extending across said opening and along the pipe for closing such communication.

8. In a low water alarm, the combination of a tubular member secured at its inner end to the crown sheet and extending through the outer shell of the boiler, a pipe within said member having a lateral opening therein, a removable plug occupying the lower portion of said member, and readily fusible material extending across the bore of said pipe and through the lateral opening, said pipe having its inner end screwed to said plug.

9. In a low water alarm, the combination of a tubular member secured at its inner end to the crown sheet and extending through the outer shell of the boiler, a pipe within said member having a lateral opening therein, a plug occupying the lower portion of said member, and having a recess in its upper end, and readily fusible material cast within the recess and surrounding the steam pipe and extending across the bore thereof through the lateral opening, said pipe having its inner end extending beyond the fusible material, and screwing into said plug.

10. In a low water alarm, the combination of a tubular member secured at its inner end to the crown sheet and extending through the outer shell of the boiler, a live steam pipe within said member concentric therewith and connected at its upper end with the steam space and having its lower end some distance above the crown sheet, a plug screwing from below into said member and engaging it at a material distance above the crown sheet and having in its upper end a cavity, the lower end of the live steam pipe extending into said cavity and fusible material cast in said cavity and surrounding the steam pipe and extending across the bore thereof, said live steam pipe having an opening in the wall thereof communicating between the bore and said cavity, and having the inner end thereof beyond the fusible material, secured to said plug.

In testimony whereof, I hereunto affix my signature.

HERMAN B. THURSTON.